United States Patent

[11] 3,622,106

| [72] | Inventor | Robert R. Brackett<br>Route 6, 8825 38th St., Kenosha, Wis. 53140 |
|---|---|---|
| [21] | Appl. No. | 30,138 |
| [22] | Filed | Apr. 20, 1970 |
| [45] | Patented | Nov. 23, 1971 |

[54] CONTROL WHEEL AILERON TRIM
1 Claim, 3 Drawing Figs.

[52] U.S. Cl. .................................................. 244/83 R, 74/552
[51] Int. Cl. .................................................. B64c 13/08
[50] Field of Search .......................................... 244/83, 93, 90; 74/522

[56] References Cited
UNITED STATES PATENTS
2,968,969  1/1961  Henning ........................ 74/552

*Primary Examiner*—Milton Buchler
*Assistant Examiner*—Carl A. Rutledge

ABSTRACT: An aileron trim device for small aircraft. This device includes a lead weight which may be placed at any desired position on the control wheel so as to prevent the pilot from having to hold pressure on the wheel when the load is heavier on one side of the craft.

INVENTOR.
ROBERT R. BRACKETT

CONTROL WHEEL AILERON TRIM

This invention relates to aircraft trim control devices and more particularly to the control wheel aileron trim device.

It is therefore the primary purpose of this invention to provide a device which will attach to the control wheel which will enable the pilot to shift and lift weight in any desired direction so as to maintain the necessary pressure on the control wheel to maintain the craft level without the pilot having to hold pressure on the aileron control wheel or when he is flying cross country.

Another object of this invention is to provide an aileron trim device which will be adaptable to most light aircraft of the two and four place category which do not come equipped with mechanical aileron trim controls.

A further object of this invention is to provide an aileron trim device which will be of such structure so as to be quickly clamped to the control wheel.

Other objects of the present invention are to provide an aileron control wheel trim which is simple in design, inexpensive to manufacture, rugged in construction easy to use and efficient in operation.

These and other objects will become readily evident upon a study of the following specification together with the accompanying drawing wherein.

Figure 1:
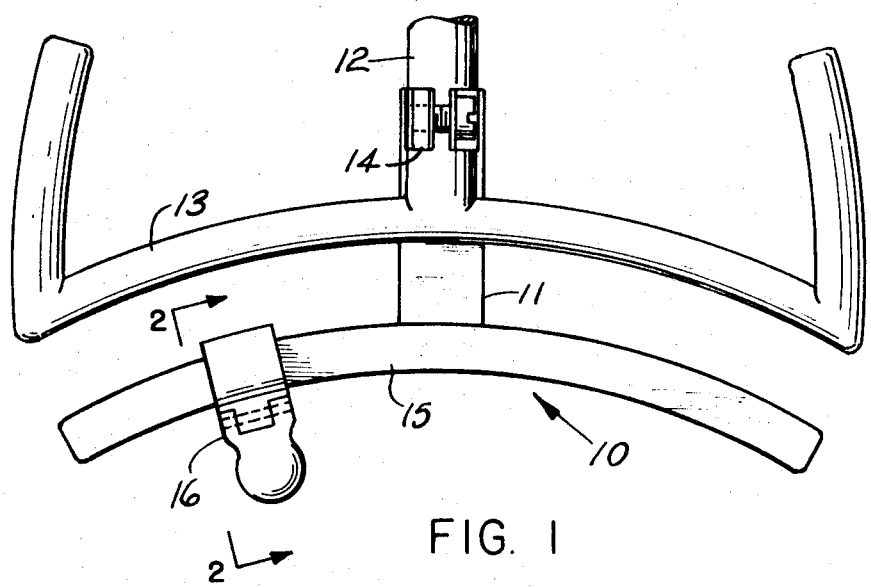
FIG. 1 is a horizontal view of the present invention shown in clamping engagement with an aircraft control wheel.
Figure 2:
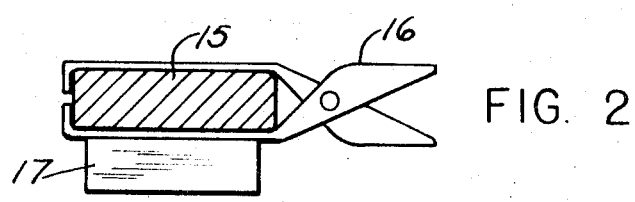
FIG. 2 is a cross-sectional view taken along the lines 2—2 of FIG. 1.

According to this invention, a trim control device 10 includes a bracket 11 which secures device 10 to the wheel post 12 of the control wheel 13. The device 10 is rendered stationary by means of a screw clamp 14. The opposite end of bracket 11 is secured to an arcuately curved flat bar 15 on which a spring clamp 16 is slideable, the clamp 16 having a lead weight 17 secured thereto.

Figure 3:
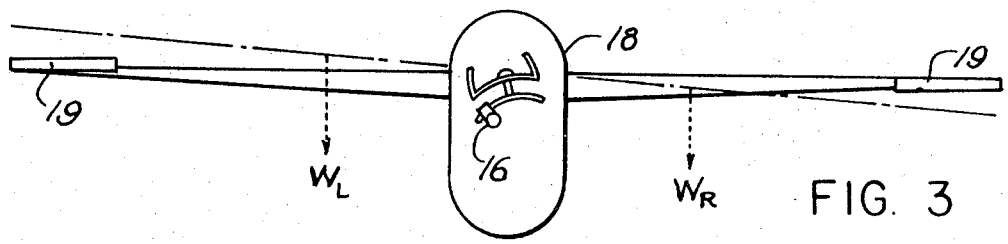
FIG. 3 is a diagrammatic end view of an aircraft shown trimmed by the present invention.

In use, as is shown in FIG. 3 of the drawing, the aircraft 18 is slightly off horizontally as indicated by the dot dash line which indicates that WR is greater than WL. The position of clamp 16 serves to apply the trim as seen at the ailerons 19 in order to return the aircraft 18 to full level as shown.

What I now claim is:

1. An aileron trim device for an aircraft, comprising an arm portion having a clamp for securing said device to the control wheel of said aircraft, an arcuate bar member supported by said arm portion a clamp and weight carried by said member and adjustably slidable thereon to any desired position, said weight being securely fixed to one jaw of said clamp.

* * * * *